UNITED STATES PATENT OFFICE.

CHARLES SNOWDEN PIGGOT, OF BALTIMORE, MARYLAND.

CATALYTIC ACCELERATION OF OXIDATION PROCESS.

1,357,000.   Specification of Letters Patent.   Patented Oct. 26, 1920.

No Drawing.   Application filed January 3, 1920. Serial No. 349,179.

*To all whom it may concern:*

Be it known that I, CHARLES SNOWDEN PIGGOT, a citizen of the United States, a resident of the city of Baltimore, State of Maryland, have invented an Improvement in Catalytic Acceleration of Oxidation Processes, of which the following is a specification.

My invention relates to the preparation and use of catalytic bodies, more particularly those suitable for the acceleration of oxidation processes, as for example the oxidation of ammonia, and has as an object the accomplishment of chemical changes, especially those involving oxidation, more expeditiously and more efficiently than heretofore.

Metal and alloys, *per se*, in a more or less finely divided condition have been used for the catalytic acceleration of chemical reactions for a considerable period of time. This use has been particularly in connection with the following processes: the conversion of the lower fatty acid derivatives into the higher fatty acid derivatives; various synthetic reactions such as the preparation of ammonia from a mixture of nitrogen and hydrogen; and, processes for converting the higher molecular constituents of petroleum into lower molecular constituents.

In accordance with my invention I have found that various oxidation processes may be accelerated by means of catalytic bodies, such as the alloys of various metals, preferably combinations of metals with manganese, as for example, an alloy of manganese, copper and silver. More in detail these alloys will assist in the oxidation of substances whereby the processes may be carried out more expeditiously and more efficiently than heretofore and various changes, which previously took place, under the conditions usually employed, too slowly to portend any commercial importance, may be accelerated to such an extent when conducted in the presence of a suitable alloy catalytic agent that they may be employed economically on a commercial scale.

I have discovered that, by bringing the substance to be oxidized into contact with a catalytic agent composed of an alloy of metals precipitated by hydrogen sulfid in alkaline solution, such as manganese and copper, manganese and silver, or, manganese, copper and silver, at a suitable temperature depending upon the particular reaction, as for example in the oxidation of ammonia to the oxids of nitrogen the temperature may be maintained at about 750° to 900° C.; and, by employing suitable means for the removal of the reaction products, many oxidation processes may be greatly accelerated and a practically complete conversion of the reaction constituents may be accomplished.

I have ascertained that alloys containing manganese, and in particular an alloy containing substantially 65 per cent. manganese, 10 per cent. silver, and 25 per cent. copper, are very satisfactory for use in the acceleration of oxidation processes when the substance to be oxidized is brought into contact with the alloy in a finely divided condition, and at a temperature at which the reaction takes place. These alloys may be prepared by mixing the pure metallic constituents in suitable proportions, then melting in a refractory vessel under the influence of a flux, such as boric acid, and finally maintaining the molten mass at a temperature above the melting point of the alloy for some time in order to insure homogeneity.

The following example sets forth for purposes of illustration one procedure whereby my process may be carried out and is not to be construed as limiting the invention to the specific statements contained therein:

A mixture of ammonia and air in the proportions of about one part by volume of ammonia to about ten parts by volume of air is brought into contact with a catalytic agent composed of an alloy of manganese, copper, and silver containing substantially 65 per cent. of manganese, 25 per cent. of copper, and 10 per cent. of silver at a rate which will permit a sufficient contact time to bring about the oxidation and at a temperature of 750° C. to 900° C. After contact with the catalytic agent the gases pass to reaction chambers wherein an additional amount of air is admitted in the proportion of about ten parts by volume to one part by volume of the ammonia originally introduced. The reaction mixture is then treated with water in the form of steam in order to convert the higher oxids of nitrogen, especially nitrogen dioxid, into nitric acid and subsequently the oxids of nitrogen which have been unconverted into nitric acid and the nitric acid which has not condensed in the reaction chambers, is absorbed by any suitable means, as for instance, a solution of caustic alkali.

A layer of the catalyst about ⅛ inch in thickness may be employed advantageously and the gas mixture may be admitted at the maximum rate at which complete oxidation takes place. In the oxidation of ammonia the above mentioned thickness of layer and a rate allowing substantially one one-hundredth of a second contact with the catalyst have proven satisfactory, however, it will be understood that the layer thickness and the rate of passage of the reaction mixture will require modification in view of the constituents present in such mixture.

The admission of a further quantity of oxygen containing gas augments the oxidation process in that thereby the conversion into the final oxidation products is hastened.

It is preferable to allow the reaction mixture to remain in contact with water in the form of steam for a period of time which will be sufficient for the reaction between the oxids of nitrogen and the water to go to completion. The absorption of the nitric acid may be advantageously carried out by conducting the gases into a vessel containing an alkaline solution and by bringing about a thorough contact between the gas and the solution by means of a mechanical stirring device.

The process above described has been especially illustrated by the oxidation of ammonia to oxids of nitrogen, but it may be generally applied to oxidation processes wherein the reaction constituents are in either the liquid or gaseous phase.

The processes usually employed heretofore, with particular reference to the oxidation of ammonia, yield only a small percentage of oxidation products, whereas the process, which is the subject of this invention, very materially increases the yield obtained and an efficiency of 95 per cent. or more may be attained.

It will of course be understood that the illustrative embodiment of my process above described may be altered and modified within the scope of the subjoined claims.

I claim:

1. The process of oxidation, which comprises bringing an oxidizable substance and an oxygen containing gas into contact with a catalytic agent composed of an alloy of metals precipitated by hydrogen sulfid in alkaline solution, at a temperature at which reaction takes place.

2. The process of oxidation, which comprises bringing an oxidizable substance and an oxygen containing gas into contact with a catalytic agent composed of an alloy containing manganese at a temperature at which reaction takes place.

3. The process of oxidation, which comprises bringing an oxidizable substance and an oxygen containing gas into contact with a catalytic agent composed of an alloy containing manganese and copper at a temperature at which reaction takes place.

4. The process of oxidation, which comprises bringing an oxidizable substance and an oxygen containing gas into contact with a catalytic agent composed of an alloy containing manganese, silver and copper at a temperature at which reaction takes place.

5. A catalytic agent, for use in oxidation processes, including an alloy composed of metals precipitated by hydrogen sulfid in alkaline solution.

6. A catalytic agent for use in oxidation processes including an alloy containing manganese.

7. A catalytic agent including an alloy containing manganese and copper.

8. A catalytic agent including an alloy containing manganese, silver and copper.

9. A catalytic agent consisting of an alloy containing substantially 65 per cent. manganese, 10 per cent. silver and 25 per cent. copper.

10. The process of oxidation, which comprises bringing a mixture of ammonia and an oxygen containing gas into contact with a catalytic agent composed of an alloy of metals precipitated by hydrogen sulfid in alkaline solution, at a temperature at which reaction takes place.

11. The process of oxidation, which comprises bringing a mixture of ammonia and an oxygen containing gas into contact with a catalytic agent composed of an alloy containing manganese at a temperature at which reaction takes place.

12. The process of oxidation, which comprises bringing a mixture of ammonia and an oxygen containing gas into contact with a catalytic agent composed of an alloy containing manganese and silver at a temperature at which reaction takes place.

13. The process of oxidation, which comprises bringing a mixture of ammonia and an oxygen containing gas into contact with a catalytic agent composed of an alloy containing manganese, silver and copper at a temperature at which reaction takes place.

14. The process of oxidation, which comprises bringing a mixture of ammonia and an oxygen containing gas into contact with a catalytic agent composed of an alloy containing manganese, silver and copper at a temperature between 750° and 900° C.

15. The process of oxidation, which comprises bringing a mixture of ammonia and an oxygen containing gas into contact with a catalytic agent composed of an alloy containing manganese, silver and copper at a temperature from 750° to 900° C., and at the maximum rate at which complete oxidation of ammonia takes place.

16. The process of oxidation, which comprises bringing a mixture of ammonia and air into contact with a catalytic agent composed of an alloy containing manganese, silver and copper at a temperature between 750° to 900° C., and at the maximum rate at which complete oxidation of ammonia takes place.

In testimony whereof I have signed my name to this specification this 31st day of December, 1919.

CHARLES SNOWDEN PIGGOT.